INVENTORS
PETER ZERNOV
OTTO J. ARNDT
BY James E. Niller
ATTORNEY

INVENTORS
PETER ZERNOV
OTTO J. ARNDT
BY James E. Nilles
ATTORNEY

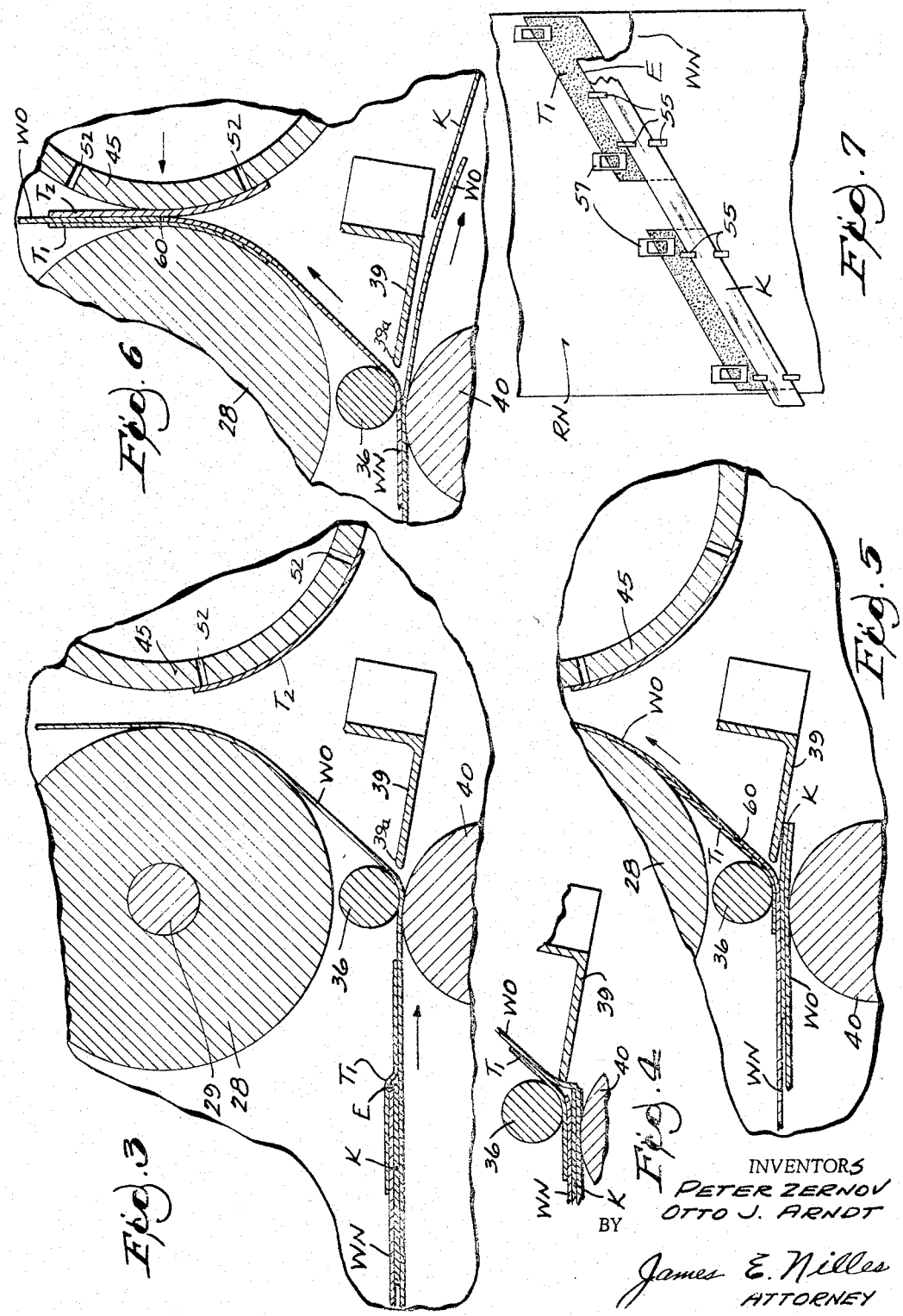

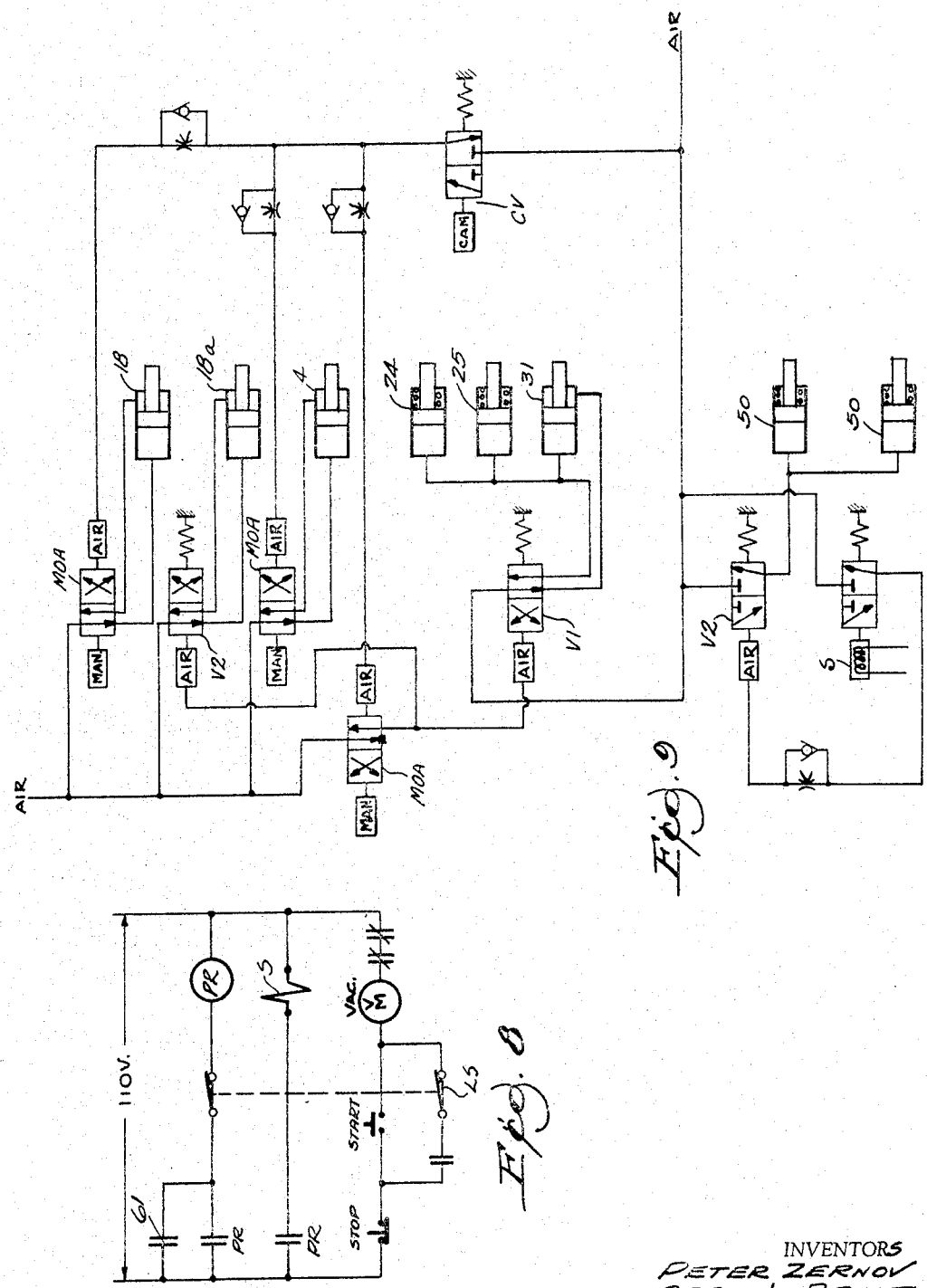

United States Patent Office 3,276,710
Patented Oct. 4, 1966

3,276,710
MEANS AND METHOD FOR FORMING A BUTT SPLICE IN A RUNNING WEB
Peter Zernov and Otto J. Arndt, Milwaukee, Wis., assignors to Zerand Corporation, Menomonee Falls, Wis., a corporation of Wisconsin
Filed Oct. 30, 1964, Ser. No. 407,785
17 Claims. (Cl. 242—59)

This invention relates to a means for and a method of forming a butt splice in a rapidly moving web.

In equipment of the type to which the present invention relates, the web moves at a high speed and a new roll of web material must be spliced to the old web in a rapid, positive and accurate manner. The butt splice joint must be smooth and strong so it will not impede the travel of the web through the printers, cutters and creasers or other apparatus.

Prior art butt splicers have utilized various apparatus, some of which comprised rapidly moving knives which either travelled across the web or were swung into engagement with the web to perform the cut. The timing on these prior devices, both of the knives and other associated equipment such as the devices for applying the tape, had to be extremely accurate, but nevertheless they were often subject to malfunction. Inertia and momentum problems were also present in these devices as were maintenance and repair problems. Other prior devices required much additional equipment to form a loop in the web whereby a portion of it could be held still momentraily while the splice was formed. Thus the prior art devices were complicated and contained many operating parts, were costly to produce, difficult to operate, adjust, calibrate and maintain and were not completely reliable or efficient in providing a smooth, strong and accurate splice.

The present invention provides an improved means and method for forming a strong, smooth and accurate butt splice between old and new running webs in a very simple manner, and avoiding the shortcomings of the above mentioned prior art devices.

More specifically, the method provided by the present invention comprises placing a loose knife with its cutting edge along the leading edge of a new web, placing tape across said leading edge so that said tape adheres to said new web and also has an exposed portion, bringing the webs together so that the exposed portion of said tape adheres to the old web, causing the knife to be moved away from said new web and in doing so causing the leading edge of said knife to cut through said old web along a line substantially coincident with the leading edge of said new web whereby a butt splice joint is formed between said webs.

The apparatus provided by the present invention includes a knife having a cutting edge, means for detachably holding said knife on said new web with the cutting edge of said knife disposed coincidentally along a leading edge of the new web, adhesive tape means on said new web and having an exposed adhesive portion extending beyond said leading edge, means for bringing said running webs together and pressing said exposed adhesive portion against said old web whereby said new web is taped to the preceding portion of said old web, and means for causing said knife to separate from said new web and cut through said old web along the leading edge of said new web to thereby form a butt joint between said new web and the preceding portion of the old web.

FIGURE 3 is a fragmentary, enlarged detail view of a portion of the apparatus shown in FIGURE 1, and showing the webs, knife and tape just prior to the cutting of the old web;

FIGURE 4 is a fragmentary view similar to FIGURE 3 and showing the knife during the cutting of the web;

FIGURE 5 is a view similar to FIGURES 3 and 4 but showing the position of the webs and knife just after the cut has been completed;

FIGURE 6 is another view similar to FIGURE 3 but showing the application of a second piece of tape over the butt point;

FIGURE 7 is a view of the knife and tape on the new web and before contact with the old web, the view being taken along line 7—7 in FIGURE 1 and having certain parts cut away for clarity;

FIGURE 8 is a diagram of an electrical circuit used with the present invention;

FIGURE 9 is a diagram of the hydraulic circuit used with the present invention.

Figure 1:
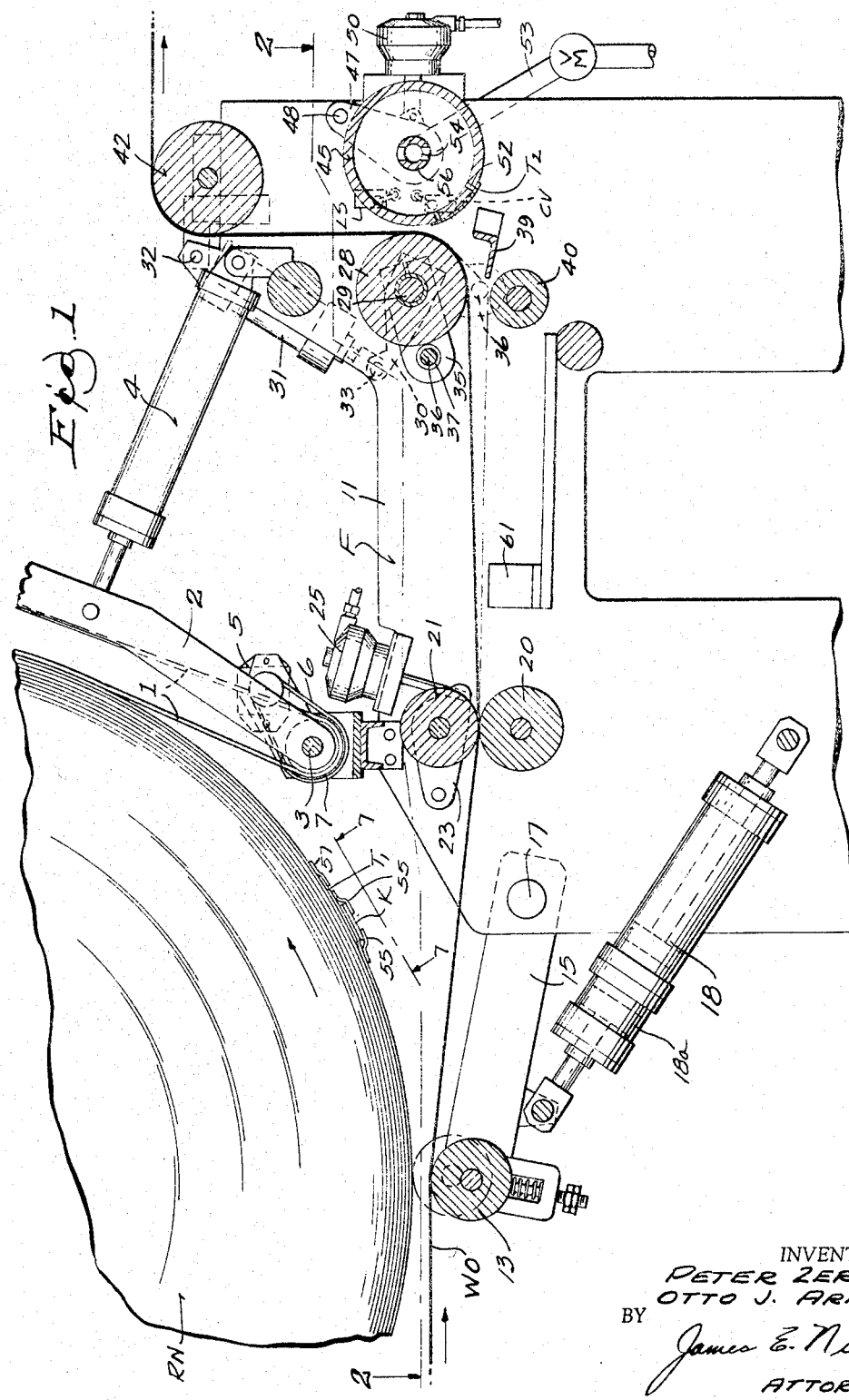
FIGURE 1 is a fragmentary, side elevational view, partially in section and with parts shown as being broken away or removed for clarity, of web handling apparatus embodying the present invention.

Referring in greater detail to the drawings, a new roll RN and web WN and an old roll (not shown) of web WO would be rotatably mounted in any suitable manner, such as on a conventional turnover stand similar to that shown in the U.S. Patent No. 3,086,725, issued on April 23, 1963. When the old roll is almost exhausted, the stand would be turned in the conventional manner so that the old web travels in proximity to the new roll as indicated in FIGURE 1.

Conventional means are provided for rotating the new roll so that its peripheral speed equals the speed of the old web. This speed synchronizing means takes the form of a driven endless belt 1 that abuts against the new rolls to bring it up to speed, the belt is mounted on a frame 2 which is swingably mounted on shaft 3 secured on the frame F of the splicing apparatus. A hydraulic cylinder assembly 4 is extensible to press the belt into driving engagement with the new roll. A motor 5 and endless belt 6 drive the pulley 7 on shaft 3 to drive the belt 1 in the known manner.

With the above means, the speeds of the web are synchronized before the splicing operation, now to be described.

The main frame F of the apparatus includes the two side walls 10 and 11 which are fabricated from heavy steel plates.

Means are provided for bringing the webs WN and WO into contact with one another when the splicing operation is about to commence, more particularly for pushing the old web WO into contact with the new roll RN. This means comprises a contact roll 13 which is rotatably mounted in the free ends of arms 14 and 15 that in turn are pivotally mounted on the side walls 10 and 11, respectively, on shafts 16 and 17. Hydraulic cylinder means 18, 18a pivotally connected between the frame F and arm 15, swings the roll 13 between the preliminary position shown in full lines in FIGURE 1 and the final or operative position shown by the broken lines. In the later position the web WO is pressed firmly against the new roll, for a purpose to be described. Means 18, 18a operates in two stages.

A pair of nip rolls 20, 21 are rotatably mounted in the frame F and the webs pass between these rolls, as will appear. Roll 20 is stationary while roll 21 is swingably mounted on arms 22, 23 by the air cylinders 24, 25, one mounted on each of the walls of the frame. Thus the nipping pressure of these rolls can be adjusted.

An idler roll 28 is rotatably mounted by shaft 29 in the frame and the web turns about 90 degrees in their direction of travel in passing around this roll. Shaft 29 is oscillatingly mounted in the frame and has an arm 30 fixed at one end thereof. A two-way hydraulic cylinder and piston assembly 31 is connected to the frame at 32 (FIGURE 1) and to the arm 30 as at 33.

Also fixed to shaft 29 are a pair of arms 34 and 35 between which shaft 36 is rotatably mounted on anti-friction bearings 37. The shaft 36 can be swung by actuation of cylinders 31 between the full line, inoperative position shown in FIGURES 1 and 2, and an operative position shown by the broken line in FIGURE 1 or the full lines shown in FIGURES 3 to 6 inclusive.

Located closely adjacent to the roll 36 when the latter is in the operative position, is an angle iron bar 39 which is secured between the side walls of the frame. The free edge 39a of this bar is located closely adjacent the discharge side of the shaft 36 and a roll 40 and acts as a guide for the cutting knife and trailing edge of the old web after the splice has been made as will more fully be referred to.

The smaller idler roll 40 journalled in the main frame, is positioned directly beneath the shaft 36 when the latter is in the operative position and acts to guide and support the cutting knife to facilitate the cutting of the web as will appear later.

Another idler roll 42 is journalled in the main frame and the webs travel over it after leaving the idler 28 and after the butt slice has been formed.

Means are provided for applying a second tape, if such is necessary, across the butt joint after the latter has been formed, this second tape being applied on the side of the web opposite to that on which the first tape is located. In some circumstances, this second tape may be unnecessary, depending on the strength of the web and also the type of web material involved. This second tape applying means consists of a roll 45 rotatably mounted in the free ends of a pair of arms 46, 47 which in turn are pivotally mounted to the main frame as at 48, and the roll is swung between a position away from the web and a position in which the roll 45 abuts against the running web. A pair of air cylinders 50 are connected to the arms 46 and 47 and provide for this swinging movement of the roll 45.

Figure 2:
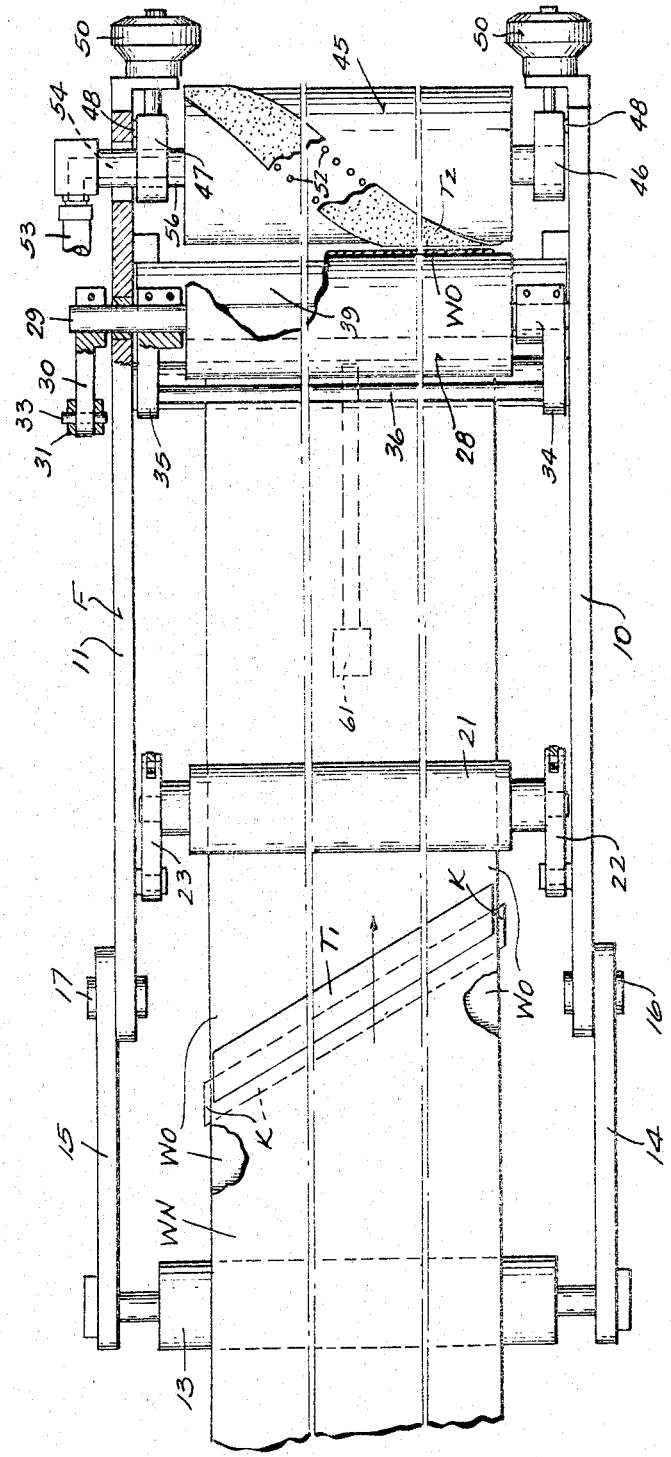
FIGURE 2 is a plan view of the apparatus shown in FIGURE 1, taken generally along the line 2—2 in FIGURE 1, certain parts being in section, broken away or removed for clarity in the drawing.

The tape applying roll 45 has a plurality of apertures 52 extending through its wall and in a spiral or helical pattern across a portion of the periphery of the roll, this pattern being shown in FIGURE 2. A vacuum source (not shown) is driven by a vacuum motor VM (FIGURE 8) and is connected to conduit 53. The interior of the roll is thus subjected to vacuum through vacuum conduit 53 and the passage 54 in the tubular shaft 56 on which the roll is mounted.

The second piece of tape T2 is thus held on the roll in a spiral manner as indicated in FIGURE 2 with the adhesive side of the tape facing in an outwardly direction.

A knife K performs the cutting operation and is a loose knife in the sense that it is not permanently mounted on the apparatus but instead consists of a flat and elongated plate of thin steel and is of the shape shown clearly in FIGURE 2.

In preparation for the cutting operation, this blade is taped to the new roll so that its forward or cutting edge is aligned with, that is to say, it is coincident with the leading edge E of the new web. As shown in the drawing for illustrative purposes, the blade and the leading edge of the web are positioned at an angle to the direction of travel, that is to say, are positioned diagonally across the web so that cutting commences at one of the side edges of the old web and then extends diagonally thereacross. The knife can be removably held on one of the flat side surfaces of the new web in any suitable manner as for example, by means of small pieces of adhesive 55 as indicated in FIGURE 7.

An elongated piece of tape T1 is fastened by its adhesive surface to the other side of the web along the leading edge thereof and an adhesive portion of this tape extends beyond or forwardly of the leading edge of the web, as shown in FIGURE 7. The forward portion of the tape T1 is held firmly against the new roll by adhesive stickers 57 or in any other suitable manner. Thus the tape is firmly attached along one of its edges to one side of the new web and along the leading edge thereof; and a portion of the tape then extends forwardly beyond the leading edge of the new web and has an adhesive portion which is exposed for ultimate cementing against the old web as will presently be described.

In the above manner, and in preparation for the web butt splicing operation to be performed, the knife is secured with its cutting edge in alignment with the leading edge of the web and is fastened to one side of the new web. The knife is thus only detachably secured to the web and can be pried off or forced to separate from the the new wed as will appear. The tape T1 is forced to adhere or is cemented to the new web along the opposite side thereof from that on which the knife is attached and the tape also extends along the leading edge of the new web and has an exposed adhesive portion extending forwardly (in the subsequent direction of web travel) of the leading edge. The above preparation of the new roll for fastening the tape T1 and the knife thereon can be made at the leisure of the operator and of course, while the new roll is stationary and while the old web WO is running.

*Operation*

The operation of the apparatus and the method involved in forming the butt joint will now be described.

With the tape T1 and knife in position as above described, the new roll RN is brought up to speed by the synchronizing belt 1 so that the peripheral speed of the new web roll is equal to the speed of the old web. The direction of travel of the new roll and old web are indicated by the arrows in FIGURE 1.

When the actual butt splicing operation is to be performed, the operator causes actuation of the hydraulic cylinder means 18 which brings the contact roll 13 to bear against the new roll RN. More specifically, the roll 13 causes the old web WO to bear against the new roll RN and the exposed portion of the tape T1 adheres to the old web when it is contacted thereby. The stickers 57 then tear away from the new roll as the leading edge of the new web together with the knife then follow the old web. The webs pass between the nip roll 20 and 21 so that the tape T1 is firmly pressed against and tightly adheres to the old web also.

The timing of the control circuitry is such that when the cylinder means 18 is actuated the air cylinders 24, 25 have also been actuated to bring the nipping rolls together by the time the new web approaches them.

The shaft 36 has also been swung to the lowermost position by the hydraulic cylinder means 31. This position of the shaft 36 is shown in FIGURES 3 to 6 inclusive, and it will be noted that the webs pass between the shaft 36 and the idler roll 40. The shaft 36 is of a relatively small diameter and the webs wrap around a portion of it in making a turn of approximately 45 degrees. This turning movement of the web causes the knife to peel away from or be pried off of the new web (FIGURES 4 and 5), the right hand end (as viewed in FIGURE 2) of the knife being first to be separated from the new web. In other words, inasmuch as the knife is of stiffer material than the web, and is held between shaft 36 and roll 40, it cannot follow the wrap around the shaft 36, and is consequently pried off or away from the shaft, causing it to cut across the old web. The old web is cut into two portions, that is, a portion which precedes and is taped to the new web, and a trailing portion.

This cutting action occurs precisely along the forward cutting edge of the knife and along and coincident with the leading edge of the new web because the cutting of the knife is located directly along the leading edge of the new web.

FIGURE 4 shows this cutting operation where the knife is being twisted or pried off or away from the shaft 36. The small pieces of adhesive material 55 are easily broken and have no appreciable influence in further holding the knife on the new roll.

As shown in FIGURE 5, the knife separates readily from the new web carrying with it the trailing portion of the old web. The guide bar 39 insures that the knife and the trailing portion of the old web are separated and directed away from the new web. In other words, the knife is deflected and falls to the floor together with the trailing portion of the old web, as shown in FIGURE 6. The knife can be reused for additional splicing operations.

Means are provided for moving the roll 45 into engagement with the webs at precisely the proper time so that the second tape T2 is applied directly across the joint, further holding the webs together. As shown in FIGURE 6, the second piece of tape T2 is applied by roll 45 on that side of the webs opposite from tape T1 and over the butt joint indicated at 60. The means for moving the roll into operative position in timed relationship with movement of the joint includes a proximity switch 61 (FIGURES 1, 2 and 8), which detects magnetic material such as the steel knife and then shorts out the magnet in the conventional reed switch of the proximity switch 61 shortly after the knife emerges from between the nip rolls 20 and 21. The switch 61 in turn actuates the air cylinders 50 to swing roll 45. Referring more specifically to the electrical and hydraulic circuits of FIGURES 8 and 9, switch 61 energizes the solenoid S which then actuates air cylinders 50 to thereby bring roller 45 into operative position. A normally closed limit switch LS (FIGURES 1 and 8) is opened by upward swinging movement of roll 45 and this switch then drops the relay R of the vacuum motor VM.

Valve V2 is a pilot operated, spring return air valve opened by solenoid S. Valve V1 is also of this type.

Cam valve CV is operated by swinging movement of roll 45 to reset the air cycle by resetting the three manually operated air valves MOA which have pilot air return. Valves MOA are thus returned to the original position where they are ready for the next cycle.

Resume

By means of the present invention a precisely formed joint is provided and one which requires no complicated mechanism. The apparatus and method of the present invention provide a butt splice for a running web without malfunction and in an automatic and trouble free manner. The cutting of the old web occurs in a simple and yet highly effective and accurate manner. The result is a smooth, strong and accurately formed butt joint.

Various modes of carrying out the invention are contemplated as being within the scope of the following claims particularly pointing out and distinctly claiming the subject matter which is regarded as the invention.

We claim:

1. A method of butt splicing old and new webs together, said method comprising, detachably securing a knife along a leading edge of the new web, placing adhesive tape on said new web and with an exposed portion of said tape extending beyond said leading edge, synchronizing the speed of and bringing said webs together so the exposed portion of said tape adheres to the running old web, and then causing the knife to separate from said new web and cut through said old web along a line coincident with the leading edge of the new web thereby forming a butt splice joint between the running new web and the preceding portion of the running old web.

2. The method of butt splicing old and new webs together which comprises, detachably securing a knife having a cutting edge on one side of the new web so that the cutting edge of the knife is directly over and aligned with a leading edge of the new web, securing adhesive tape on the opposite side of said new web and with an exposed adhesive portion of said tap extending across the said leading edge thereof, synchronizing the speed of said webs, bringing said webs together so the exposed portion of said tape adheres to the preceding portion of the old web, and then causing the knife to separate from said new web and cut through said old web along a line coincident with the leading edge of the new web thereby separating the old web into a preceding portion and a trailing portion and forming a butt splice joint between the running new web and the preceding portion of the running old web.

3. A method of butt splicing old and new webs together, said method comprising, detachably securing a knife along a leading edge of the new web, placing adhesive tape on said web and with an exposed portion of said tape extending beyond said leading edge, synchronizing the speed of and bringing said webs together so the exposed portion of said tape adheres to the running old web, and then causing the webs to abruptly change direction of travel and consequently the knife to peel off and separate from said new web and cut through said old web along a line coincident with the leading edge of the new web thereby forming a butt splice joint between the new web and the preceding portion of the old web.

4. A method of butt splicing old and new webs together, said method comprising, while the new web is formed as a roll and is not rotating, detachably securing a knife along a leading edge of the new web, and securing adhesive tape to said web and with an exposed portion of said tape facing outwardly of said roll and extending beyond said leading edge, then rotating the new roll and synchronizing its peripheral speed with the speed of the running old web, forcing the old web against the new roll and thereby against the exposed portion of said tape so that the latter adheres to the old web, and then causing the knife to separate from said new web and cut through said old web along a line coincident with the leading edge of the new web thereby separating the old web into a preceding portion and a trailing portion and forming a butt splice joint between the running new web and said preceding portion of the running old web.

5. A method of butt splicing old and new webs together, said method comprising, while the new web is formed as a roll and is not rotating, detachably securing a knife having a cutting edge along a leading edge of the new web and on one side thereof, securing adhesive tape to the opposite side of said web and with an exposed portion of said tape facing outwardly of said roll and extending beyond said leading edge, rotating the roll and synchronizing its peripheral speed with the speed of the running old web, pressing the old web and new roll together so the exposed portion of said tape adheres to the old web, and then causing the webs to abruptly change direction of travel and consequently the knife to peel off and separate from said new web and cut through said old web along a line coincident with the leading edge of the new web thereby separating the old web into a preceding portion and a trailing portion and forming a butt splice joint between the running new web and the preceding portion of the running old web.

6. Apparatus for forming a butt slice joint between old and new running webs, said apparatus comprising, cutting means detachably held on said new web and in alignment with a leading edge thereof, adhesive means secured to said new web and having an exposed portion extending beyond said leading edge, means for bringing said running webs together whereby said adhesive portion bears against and is secured to said old web and said new web is consequently connected to the old web, and means for causing said cutting means to separate from said new web and cut through said old web along the leading edge of said new web to thereby form a butt joint between said new web and the preceding portion of the old web.

7. Apparatus as defined in claim 6 further characterized in that said last mentioned means includes, a shaft partially around which the webs travel and are thereby caused to abruptly change direction of travel, and a roller cooperating with said shaft in guiding said cutting means as it passes therebetween with said webs and the latter are changed in their direction.

8. Apparatus as set forth in claim 7 including means for guiding said cutting means away from said new web after the old web has been cut.

9. Apparatus as defined in claim 6 including, rotary means for applying second adhesive means across said joint and on that side of said web opposite from the first adhesive means, and control circuit means actuated by said cutting means as the latter travels with the webs and for operating said rotary means in timed relationship with the travel of said joint.

10. Butt splicing apparatus for forming a butt splice joint between old and new running webs and comprising, a knife having a cutting edge and detachably held on said new web with said cutting edge aligned with and along a leading edge of the new web, adhesive tape means on said new web and having an exposed adhesive portion extending beyond said leading edge, means for bringing said running webs together and pressing said exposed adhesive portion against said old web whereby said new web is taped to the preceding portion of said old web, and means for causing said webs to abruptly change direction of travel and consequently said knife to peel off of and to separate from said new web and in doing so cut through said old web along the leading edge of said new web to thereby form a butt joint between said new web and the preceding portion of the old web.

11. Apparatus as defined in claim 10 further characterized in that said last mentioned means includes a shaft partially around which the webs travel and are thereby caused to abruptly change direction of travel, and a roller cooperating with said shaft in guiding said knife as the latter passes between said roller and shaft together with said webs and as the latter are changed in their direction.

12. Apparatus as set forth in claim 11 including means for guiding said knife away from said new web after the old web has been cut.

13. Apparatus as defined in claim 10 including, rotary means for applying second adhesive tape means across said joint and on that side of said web opposite from the first adhesive tape means, and control circuit means actuated by said knife as the latter travels with the webs and for operating said rotary means in timed relationship with the travel of said joint.

14. Butt splicing apparatus for forming a butt splice joint between an old running web and a new web of a web roll, said apparatus comprising, a knife having a cutting edge and detachably held on one side of said new web with the cutting edge of said knife disposed coincidentally along a leading edge of the new web, adhesive tape means secured to the other side of said new web and having an exposed adhesive portion facing outwardly of said roll and extending beyond said leading edge, means for brining the peripheral speed of said roll up to the speed of said old web, means for brining said running old web and said roll together and pressing said exposed adhesive portion against said old web whereby said new web is taped to the preceding portion of said old web, and means for causing said knife to separate from said new web and cut through said old web along the leading edge of said new web to thereby form a butt joint between said new web and the preceding portion of the old web.

15. Apparatus as defined in claim 14 further characterized in that said last mentioned means includes, a shaft partially around which the webs travel and are thereby caused to abruptly change direction of travel, and a roller cooperating with said shaft in guiding said knife as the latter passes between said roller and shaft together with said webs and the latter are change in their direction.

16. Apparatus as set forth in claim 15 including means for guiding said knife away from said new web after the old web has been cut.

17. Apparatus as defined in claim 14 including, rotary means for applying second adhesive tape means across said joint and on that side of said web opposite from the first adhesive tape means, and control circuit means for operating said rotary means in timed relationship with the travel of said joint.

No references cited.

FRANK J. COHEN, *Primary Examiner.*

L. D. CHRISTIAN, *Assistant Examiner.*